United States Patent [19]

Lindgren et al.

[11] Patent Number: 4,703,885

[45] Date of Patent: Nov. 3, 1987

[54] METHOD OF WELDING AUSTENITIC STEEL TO FERRITIC STEEL WITH FILLER ALLOYS

[75] Inventors: James R. Lindgren, Del Mar; Brian E. Thurgood, San Diego; James B. Wattier, Encinitas, all of Calif.

[73] Assignee: GA Technologies Inc., San Diego, Calif.

[21] Appl. No.: 862,012

[22] Filed: May 12, 1986

Related U.S. Application Data

[63] Continuation-in-part of Ser. No. 798,627, Nov. 15, 1985, abandoned.

[51] Int. Cl.⁴ .................... C22C 38/44; C22C 19/03
[52] U.S. Cl. .................... 228/263.15; 420/584; 420/453; 420/67
[58] Field of Search ............ 420/452, 453, 584, 52, 420/96, 97, 112, 67; 219/137 WM, 146.41, 146.23; 228/263.14, 263.15

[56] References Cited

U.S. PATENT DOCUMENTS

| | | | |
|---|---|---|---|
| 537,006 | 2/1957 | Carpenter | 428/683 |
| 2,769,227 | 11/1956 | Sykes et al. | 428/683 |
| 2,963,129 | 12/1960 | Eberle | 428/683 |
| 3,052,016 | 9/1962 | Zimmer | 428/685 |
| 3,179,790 | 3/1973 | Plöckinger et al. | 420/67 |
| 4,149,063 | 4/1979 | Bishel | 219/146.2 |

FOREIGN PATENT DOCUMENTS 60-224765  10/1985  Japan ..................... 420/67

Primary Examiner—Melvyn J. Andrews
Assistant Examiner—Deborah Yee
Attorney, Agent, or Firm—Fitch, Even, Tabin & Flannery

[57] ABSTRACT

An austentic steel component is fused to a ferritic steel component with a filler alloy specifically formulated to have a thermal coefficient of expansion similar to that of the ferritic steel, a creep rate intermediate between that of the ferritic and austenitic steels, a rupture strength at least as great as that of the ferritic steel, and a carbon activity intermediate that of the ferritic and austenitic steels. Suitable filler alloys have the following general compositions: (1) 1–3% nickel, 11–13% chromium, 1.6–2.0% molybdenum, 0.07–0.1% carbon, 0.5–0.9% manganese and 0–1.5% tungsten, balance iron, and (2) 41–56% nickel, 3.5–10.0% chromium, 1.6–2.5% molybdenum, 0.03–0.1% carbon and 0.5–2.0% manganese, balance iron.

3 Claims, No Drawings

METHOD OF WELDING AUSTENITIC STEEL TO FERRITIC STEEL WITH FILLER ALLOYS

This application is a continuation-in-part of Ser. No. 798,627, filed Nov. 15, 1985, now abandoned.

The present invention relates to dissimilar metal weldments for high temperature use and more particularly to filler alloys for weldments between ferritic steel and austenitic steel and to methods of welding such materials using these alloys.

BACKGROUND OF THE INVENTION

In many high temperature applications, it is necessary to join together tubular parts of substantially different chemical and physical characteristics. For example, such applications arise in fossil-fired boiler construction and in nuclear power stations. In such power stations, high temperature joints are commonly required in various heat exchanger components such as boilers, steam generators, intermediate heat exchangers and recuperators, particularly in high temperature gas-cooled reactors, etc. Similar applications arise in other industries, such as petrochemical equipment and chemical processing plants having substantial requirements for heat exchangers, steam lines and the like.

In all of these applications, it is usually necessary to form large numbers of tubular interconnections between materials of substantially different characteristics. Usually, one component of the tubular interconnection is formed from a high temperature alloy that is particularly suited for withstanding high temperature environments. At the same time, it is necessary for the interconnection or transition joint to withstand similar severe operating conditions of temperature, pressure, etc., over extended periods of time.

Under conditions of the type described above, the different types of materials to be interconnected by the transition joint exhibit substantially different physical characteristics making it difficult to maintain continuity throughout the transition joint. For example, the existence of very different thermal expansion rates on opposite sides of any given bond within such a high temperature joint tends to produce particularly severe stresses, tending to cause cracking or total disruption of the bond. Other factors also exist within such transition joints which further interfere with the maintenance of an effective continuous transition joint or interconnection.

In many such high temperature applications, the different tubular materials to be interconnected consist of a low alloy steel or carbon steel on the one hand and, on the other hand, a high temperature alloy composition adapted to best withstand the severe high temperature conditions. Welding of such steel components is particularly contemplated by the present invention, and the high temperature alloy may contain approximately 16–20% chromium or more. Examples of such high temperature alloys include wrought or cast austenitic steels, particularly austenitic 300 series stainless steels, such as ASTM or ASME type 321H stainless steel or 304H stainless steel. The low alloy, carbon-containing steels may be ASTM or ASME SA213 Grade T-22 steel containing, for example 2¼% chromium, 1% molybdenum.

Substantial efforts have been expended in the past to develop effective transition joints for such applications. One such approach has been the formation of the joint with continuously changing chemical composition along the length of the joint, for example, by electroslag techniques, with one end of the joint being joined to the other tubular piece of substantially different composition and characteristics. Many different types of materials, such as powder metallurgy components and the like, have also been employed to form transition joints. Heat treatment has also been employed both prior to and following formation of the transition joint in order to better condition the transition joint and interconnecting bonds to withstand severe operating conditions of the type referred to above.

A recent solution to the problem of dissimilar metal weldments (DMWs) has been the use of stepped transition joints. In such joints, a member is pre-formed from a plurality of sections that are welded together. The sections of the member are selected to generally provide a gradient of chemical composition and physical properties between the austenitic and ferritic components which are being joined together. For example, the chromium contents and thermal coefficients of expansion of the several segments are generally progressively graded between one end of the member and the other. While such stepped transition joints have generally been found to work well, multiple welded members are relatively expensive.

There remains a need for improved and simpler techniques for welding dissimilar metals, particularly for welding austenitic components to ferritic components.

SUMMARY OF THE INVENTION

Austenitic stainless steel and ferritic steel components are directly welded together using filler alloys that are formulated specifically for this purpose. Filler alloys according to the invention have a thermal coefficient of expansion similar to that of the ferritic steel, a creep rate intermediate between that of the ferritic and austenitic steels, a creep rupture strength at least as great as that of the ferritic steel, and a carbon activity intermediate that of the ferritic and austenitic steels so as to limit carbon transport from the ferritic steel component to the filler metal alloy. More particularly, a high chromium austenitic stainless steel component, such as a component formed from austenitic 300 series stainless steel, is welded to a ferritic component, such as T-22, using a welding filler alloy having either 1) a composition of about 1–3% nickel, 11–13% chromium, 1.6–2.0% molybdenum, 0.07–0.1% carbon, 0.5–0.9% manganese and 0–1.5% tungsten, balance iron or 2) a composition of about 41–56% nickel, 3.5–10.0% chromium, 1.6–2.5% molybdenum, 0.03–0.1% carbon and 0.5–2.0% manganese, balance iron. (All percentages expressed herein are in weight percent unless otherwise specified). Filler metal alloys of these general compositions have physical properties that make them suitable for forming bimetallic welds which can be expected to last as long as the welded component parts themselves.

DETAILED DESCRIPTION OF THE PREFERRED EMBODIMENTS

In accordance with the present invention, alloys are formulated specifically for directly welding an austenitic stainless steel component, particularly a 300 series stainless steel component, to a ferritic steel component, such as 2¼% Cr, 1% Mo ferritic steel.

Generally, in accordance with the invention, an austenitic steel component is welded to a ferritic steel component using a filler alloy having a thermal coefficient of expansion similar to that of the ferritic steel, a creep rate intermediate between that of the ferritic and austenitic steel, a rupture strength at least as great as that of the ferritic steel, and a carbon activity intermediate that of the ferritic and austenitic steels, positioning the austenitic and ferritic steel components for joining the components in a desired configuration, fusing the filler alloy with adjacent surfaces of the positioned ferritic and austenitic components and allowing the fused material to solidify, forming a weld between the components.

Two particular types of welding filler alloys are used for joining the austenitic stainless steel component to the ferritic stainless steel component. One type is a stainless steel having a moderately high chromium content, this alloy having a composition of about: 1–3% Ni, 11–13% Cr, 1.6–2.0% Mo, 0.07–0.1% C, 0.5–0.9% Mn and 0–1.5% W, balance Fe. The other type of filler alloy is a nickel-based alloy having a composition of about 41–56% Ni, 3.5–10.0% Cr, 1.6–2.5% Mo, 0.03–0.1% C, 0.5–2.0% Mn, balance Fe.

The filler alloys each have a thermal coefficient of expansion generally similar to ferritic steel of $2\frac{1}{4}$% Cr, 1% Mo. The thermal coefficient of expansion is selected to be similar to that of the ferritic steel, rather than to that of the austenitic steel, because the ferritic steel is weaker and is more susceptible to failure due to stresses caused by differential thermal expansion at the weldment. Preferably, the filler alloy has a thermal coefficient of expansion which ranges from about 20% below to about 20% above that of the ferritic steel, from room temperature through the intended use temperature range, typically up to about 1100° F. In order to produce the most stable dissimilar metal weldments, it is preferred that the filler alloy have a mean thermal coefficient of expansion of between about $6 \times 10^{-6}$/°F. and about $9 \times 10^{-6}$/°F. at 1050° F.

Each filler alloy has a metal creep rate intermediate between that of $2\frac{1}{4}$% Cr, 1% Mo ferritic steel and 300 series stainless steel. The creep rates of these filler alloys are lower than the creep rates of currently used filler metals, facilitating stress redistribution. The metal creep rate of filler alloys according to the invention is between that of $2\frac{1}{4}$-Cr-1 Mo steel and that of 304 stainless, preferably about halfway between. Filler alloys according to the invention preferably have creep rates at 13,000 psi and 1050° F. of between about $10^{-5}$ and $10^{-6}$ percent per hour.

Weldments between austenitic and ferritic steel components using either of these alloy types have better creep rupture strengths than that of a $2\frac{1}{4}$% Cr, 1% Mo ferritic steel component in order that the weldment itself poses no limitation to the stresses which the components, so welded, can withstand beyond the stress capacities of the components themselves. Very importantly, the filler alloy itself is formulated to have a creep rupture strength higher than that of the ferritic steel because any weldment itself will contain irregularities, tending to decrease its strength relative to the more regularly formed ferritic steel component. Preferably the creep rupture strength of the filler alloy is such that in cross joint rupture tests of a ferritic steel to austenitic steel weldment, the weldment will withstand a constant stress of at least about 4500 psi for 2000 hours at 1050° F.

It is desirable to retard carbon migration, particularly at the ferritic steel-filler alloy interface because (1) carbon that transfers to the fillers tends to produce structure-weakening carbides and (2) carbon transferred from the ferritic steel reduces the strength of the ferritic steel adjacent to the ferritic steel-filler alloy interface. Carbon migration is retarded by the selection of a filler alloy with a particularly suitable carbon activity. "Carbon activity" is defined and discussed, in *The Making and Shaping of Steel*, 9th Edition, Harold E. McGannon, editor, Herbik & Held, Pittsburg (1971) pp. 301–302. The filler alloys of the present invention have carbon activities of between that of $2\frac{1}{4}$Cr-1 Mo Steel and that of 304 stainless steel to adequately retard carbon transport from the ferritic steel into the filler alloy. Preferably, the filler alloy is formulated to have a carbon activity somewhat closer to that of the ferritic steel than to that of the austenitic steel.

Advantageously, at the ferritic steel-filler alloy interface, more type II carbides form than type I carbides. Type I carbides are a planar array of globular carbide structures, whereas type II carbides are a diffuse array of similar, but smaller, carbide structures. Voids tend to form around carbide structures, and if the carbides are too large and/or too closely aligned, as in type I, the voids can extend and interconnect to form cracks and eventually cause structural failure. Type II carbides, being smaller and more diffuse, produce less localized structural weakening at the interface.

The filler alloys have corrosion resistance to steam as well as to gases commonly used, for example, in gas-cooled nuclear reactors. The alloys resist embrittlement and have good operability and weldability.

Most commonly, the filler alloys are provided in wire form to facilitate welding therewith, for example, as a consumable electrode in arc welding apparatus. Typically, the alloys are formed into wires between about 0.015 and about 0.25 inch in diameter. However, the welding alloy may be provided in whatever form is suitable for the particular type of welding used to form the dissimilar metal weldment. For example, for friction welding two tubular components, the filler alloy is formed into an annular washer.

Depending upon the requirements of the welding method, the filler alloy maybe either coated with flux or left uncoated. Flux-coated electrode wires are typically between about 1/16 and 5/16 inch in diameter.

The term "welding" herein is intended to incorporate any suitable process where the filler alloy is fused or melted along with surface portions, e.g., edges or ends, of the components that have been positioned for joining. Suitable welding processes using the filler alloys include but are not limited to arc welding, resistance welding, gas welding, electron beam welding, laser welding, friction welding and the various modifications of these processes. The choice of the welding process may depend upon the configuration of the components and whether they are already fixed in place or whether they are to be pre-welded before being inserted as components of larger apparatus. For example, two free tubular components of dissimilar metals may be joined by friction welding, and the pre-welded components then inserted as a pre-welded joint into the apparatus. On the other hand, if one of the tubular components parts is already established in place in the apparatus, another process, such as arc welding, is used.

Because the dissimilar metal weldment is typically more subject to failure than weldments between similar metal weldments, it is often preferred to provide a preformed transition joint between an austenitic steel component and a ferritic steel component with a "dutchman joint" (a precise weldment produced in a shop under generally optimal conditions) and then weld the joint into place at the application site with two ordinary similar metal weldments, which require somewhat less precision to provide adequate strength and long life.

Alloys used in accordance with the present invention are generally effective for forming austenitic steel to ferritic steel weldments. The alloys are most useful for joining an austenitic steel of the 300 series to a ferritic steel, such as low alloy and carbon steels. Carbon steels are steels which contain minor amounts of carbon, silicon and manganese as alloying elements but do not contain any significant amounts of chromium or molybdenum. Low alloy steels further contain up to about 3 percent by weight of chromium and up to about 2 weight percent by weight of molybdenum. Examples of suitable carbon steels are given in McGannon, ed., supra., at pages 1117–1121 and 1204 and examples of suitable low alloy steels are given at pages 1149 and 1153–1155. 300 series austenitic steels are described in the 1983 *Annual Book of ASTM Standards*, section 1, Iron & Steel Products, Vol. 01.01, ASTM, Philadelphia. Suitable tubular ferritic steels are described on pages 143–148 of this work, and suitable austenitic tubular steels are described on pages 213–282. Commonly used tubular ferritic steels are ASTM T-11 and T-22. Commonly used tubular austenitic steels include TP-304, TP-316, TP-321 and TP-347.

The invention will now be described in greater detail by way of specific examples.

EXAMPLE I

Several filler alloys were specially formulated according to the general formulae, described above, and based upon potential useful properties for filler alloys. Three of these, one HFS-3, a 400 series type stainless steel, and two others HFS-5 and HFS-6, nickel-based alloys, were selected for evaluation in welding an austenitic steel component to a ferritic steel component. The compositions of these alloys were as follows:

|       | Ni   | Cr   | Mo   | C   | Mn  | Fe      |
|-------|------|------|------|-----|-----|---------|
| HFS-3 | 2.63 | 12.1 | 1.93 | .10 | .68 | balance |
| HFS-5 | 42.0 | 3.95 | 1.74 | .08 | .82 | balance |
| HFS-6 | 42.0 | 8.05 | 1.79 | .09 | .82 |         |

These alloys were converted to 3/32 inch diameter wire with no production difficulties.

The mean and instantaneous coefficients of thermal expansion of the two alloys were compared with 304 stainless steel and with 2¼% Cr, 1% Mo Ferritic steel over a temperature range of 400° F. to 1100° F., typical temperature ranges to which dissimilar metal weldments are exposed in steam boilers used in association with nuclear reactor facilities. The following results were observed.

| Mean Thermal Expansion Coefficient ($10^{-6}$/°F.) | | | | | |
|---|---|---|---|---|---|
|  | 400° F. (204° C.) | 600° F. (315° C.) | 800° F. (427° C.) | 1000° F. (538° C.) | 1100° F. (593° C.) |
| 304 | 9.19 | 9.53 | 9.82 | 10.07 | 10.18 |
| 2¼Cr—1Mo | 6.958 | 7.304 | 7.533 | 7.740 | 7.833 |
| HFS-3 | 5.9 | 5.8 | 6.3 | 6.3 | 6.6 |
| HFS-5 | 4.1 | 4.8 | 5.8 | 6.8 | 6.8 |
| HFS-6 | 5.9 | 7.1 | 7.7 | 8.2 | 8.4 |

Instantaneous Thermal Expansion Coefficient ($10^{-6}$/°F.)

| | 400° F. | 600° F. | 800° F. | 1000° F. | 1100° F. |
|---|---|---|---|---|---|
| 304 | 9.80 | 10.37 | 10.80 | 11.15 | 11.31 |
| 2¼Cr—1Mo | 7.503 | 8.001 | 8.375 | 8.569 | 8.607 |
| HFS-3 | 5.9 | 6.7 | 6.7 | 6.9 | 7.1 |
| HFS-5 | 6.4 | 7.9 | 8.8 | 11.0 | 11.0 |
| HFS-6 | 8.5 | 9.0 | 9.2 | 9.4 | 9.6 |

The coefficients of thermal expansion of the filler alloys are sufficiently close to those of the ferritic steel alloy throughout the 400° F. to 1100° F. temperature range and particularly throughout the 800° F. to 1100° F. temperature range for purposes of forming a strong dissimilar metal weldment.

Room temperature tensile strength measurements were also made, and the following results were observed.

| Alloy | 0.2% Yield Strength (ksi) | Ultimate Tensile Strength (ksi) |
|---|---|---|
| HFS-6 | 28.5 | 78.5 |
| HFS-3 | 83.9 | 126.5 |
| 2¼Cr—1Mo (ASME code) | 30.0 (min.) | 60.0 (min.) |
| 304SS (ASME code) | 30.0 (min.) | 70.0 (min.) |

Alloy HFS-6 proves to be as strong as the austenitic stainless steel alloy and alloy HFS-3 proves to be about 50% stronger than the austenitic stainless steel alloy.

EXAMPLE II

Pieces of 2.0 inch OD, 1.2 inch ID tube of 2¼% Cr, 1% Mo were welded to 304 austenitic stainless steel plate using wires formed of each of alloys HFS-3 and HFS-6 as welding fillers. The weldments were made by the gas-tungsten arc welding process without difficulty, indicating satisfactory weld wire operability.

The dissimilar metal weldment were subject to radiography and typical ASME B&PV code Section IX tests. Dissimilar metal weldments with either filler alloy passed the QB163 acceptance criteria of the QB162 ASME room temperature bend test. The results of the QB152 ASME tensile tests are as follows:

| Material | Ultimate Tensile Strength (ksi) | 0.2% Yield Strength (ksi) | % Elongation | Failure Location |
|---|---|---|---|---|
| 2¼Cr—1Mo welded to 304SS with HFS-6 | 43.6 | 70.7 | 21.8 | PM[a] |
| 2¼Cr—1Mo welded to 304SS with HFS-3 | 49.1 | 78.8 | 15.7 | PM[a] |
| 2¼Cr—1Mo parent metal (ASME code) | 30.0 (min.) | 60.0 (min.) | — | — |

[a]PM = parent metal

These results are sufficient to satisfy the ASME QB153 acceptance criteria for the QB152 test. Metallographic examination of the weldments by radiographic techniques indicated that the welds were free of defects and exhibited satisfactory microstructures.

Both of the dissimilar metal weldments were thermally aged for 911 hours at 1150° F. Sections were taken through the interfaces between the ferritic steel and the filler alloy. Scanning electron photomicrographs were taken of the interface sections. In each case, very little evidence of carbon transport across the interface was observed. Formation of type I carbides was minimal. The lack of carbon transport was confirmed by microhardness measurements.

Cross joint creep rupture tests were performed on bimetallic weldments between a 2¼% Cr, 1% Mo tubular components and 304 austenitic steel plates, with filler alloy HFS-3 and with filler alloy HFS-6. In each case, the weldments withstood constant stresses of 4800 psi for 2000 hours at 1050° F. This is about 20% higher than a similar weldment formed within Inconel 82, a commonly used filler alloy, which would withstand constant stresses of only about 4000 psi under similar conditions.

Several advantages of the invention can now be more fully appreciated. By providing the filler metals of particularly formulated composition, ferritic alloy components may be directly welded to austenitic stainless steel alloy components. The resulting DMWs are as strong as the component alloy parts themselves and are expected to have usable lives as long or longer than the life expectancy of the welded components in high temperature, high pressure, corrosive environments, such as are found in boilers associated with nuclear reactors.

While the invention has been described in terms of certain preferred embodiments, modifications obvious to one with ordinary skill in the art may be made without departing from the scope of the present invention.

Various features of the invention are set forth in the following claims.

What is claimed is:

1. A method of welding an austenitic steel component containing at least about 16% by weight chromium to a ferritic steel component comprising providing a filler alloy selected from the group consisting of (a) composition consisting essentially of about 1–3% nickel, 11–13% chromium, 1.6–2.0% molybdenum, 0.07–0.1% carbon, 0.5–0.9% manganese and 0–1.5% tungsten, balance iron, and (b) composition consisting essentially of about 41–56% nickel, 3.5–10.0% chromium, 1.6–2.5% molybdenum, 0.03–0.1% carbon and 0.5–2.0% manganese, balance iron, said alloy having a thermal coefficient of expansion of between about $6 \times 10^{-6}/°F.$ and about $9 \times 10^{-6}/°F.$ at 1050° F. and similar to that of the ferritic steel, a creep rate at 13,000 psi at 1050° F. of between about $10^{-5}$ to $10^{-6}$ percent per hour and intermediate between that of the ferritic and austenitic steels, a creep rupture strength of at least about 4500 psi at 1050° F. for 2000 hrs. and at least as great as that of the ferritic steel, and a carbon activity intermediate that of the ferritic and austenitic steels so as to limit carbon transport from the ferritic steel component to said filler metal alloy, positioning said ferritic steel component and said austenitic steel component for joining in a desired configuration, fusing said filler alloy to adjacent surfaces of said positioned components, and then allowing the fused material to solidify, forming a weld between said components.

2. A method according to claim 1 wherein said austenitic component is a 300 series stainless steel.

3. A method according to claim 1 wherein said ferritic component is a low alloy steel or a carbon steel.

* * * * *